(12) United States Patent
Harris et al.

(10) Patent No.: US 6,795,936 B2
(45) Date of Patent: *Sep. 21, 2004

(54) BUS BRIDGE RESOURCE ACCESS CONTROLLER

(75) Inventors: Jeremy Graham Harris, Chalfont St. Giles (GB); Paul Durrant, Farnham Royal (GB)

(73) Assignee: Sun Microsystems, Inc., Santa Clara, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 09/783,118

(22) Filed: Feb. 13, 2001

(65) Prior Publication Data

US 2002/0040451 A1 Apr. 4, 2002

(30) Foreign Application Priority Data

Oct. 3, 2000 (GB) .......................................... 0024189

(51) Int. Cl.$^7$ ................................................ G06F 11/00
(52) U.S. Cl. ........................................ 714/42; 714/46
(58) Field of Search ........................... 714/3, 5, 39, 42, 714/43, 47, 48; 711/202, 203; 718/104

(56) References Cited

U.S. PATENT DOCUMENTS

| | | | | |
|---|---|---|---|---|
| 4,188,670 A | * | 2/1980 | Hsia ............................. | 365/49 |
| 4,719,626 A | * | 1/1988 | Ogasawara .................. | 714/33 |
| 4,972,345 A | * | 11/1990 | Munier et al. ................ | 714/48 |
| 5,450,573 A | | 9/1995 | Gronemeyer | |
| 5,455,834 A | * | 10/1995 | Chang et al. ............... | 714/768 |
| 5,493,660 A | | 2/1996 | DeLano et al. | |
| 5,627,965 A | * | 5/1997 | Liddell et al. ................ | 714/48 |
| 5,819,027 A | * | 10/1998 | Budelman et al. ............ | 714/47 |
| 5,881,282 A | * | 3/1999 | Shipman ........................ | 713/2 |
| 6,067,634 A | * | 5/2000 | Nelson ........................... | 714/4 |
| 6,145,055 A | * | 11/2000 | Fujimoto ..................... | 711/128 |
| 6,353,898 B1 | * | 3/2002 | Wipfel et al. ................. | 714/48 |
| 6,532,505 B1 | | 3/2003 | Stracovsky et al. | |
| 6,560,724 B1 | * | 5/2003 | Ganske ......................... | 714/43 |
| 6,651,182 B1 | | 11/2003 | Chang et al. | |

FOREIGN PATENT DOCUMENTS

| | | |
|---|---|---|
| EP | 0 380 093 | 1/1989 |
| WO | 00/60462 | 10/2000 |

OTHER PUBLICATIONS

Combined Search and Examination Report for Application No. GB 0024189.3 dated Sep. 21, 2001.

* cited by examiner

*Primary Examiner*—Nadeem Iqbal
*Assistant Examiner*—Tim Bonura
(74) *Attorney, Agent, or Firm*—Meyertons Hood Kivlin Kowert & Goetzel, P.C.; B. Noël Kivlin

(57) ABSTRACT

Resource access control is provided in a manner that avoids unnecessary resource accesses where a resource is already known to be faulty. A resource access controller controls access to resources addressed by at least one central processing unit. The resource access controller includes an address translation mechanism providing fake response identification as to whether or not a response is to be faked. The resource access controller also includes a fake response generator for selectively generating a faked response where the fake response identification of the corresponding translation entry indicates that a response is to be faked. The resource access controller is able to associate fake response indications with a resource and to generate a fake response when an attempt is made to access a resource labeled such that a faked response should be returned. The resource access controller can form part of a bridge that interconnects a first bus connected to a processor of the computer system, which processor includes at least one said central processing unit, and at least a second bus. However, the resource access controller can be provided at other points in a computer system where an address translation is performed, for example in a memory management unit.

32 Claims, 12 Drawing Sheets

FIG 8

Tag: G | — | Context | — | VA_tag<63:22>
bits: 63 | 62 61 | 60 | 48 47 | 42 41 | 0

Data: V | Size | NFO | IE | Soft2 | Diag | PA<40:13> | Soft | L | CP | CV | E | P | W | G
bits: 63 | 62 61 | 60 | 59 | 58 | 50 49 | 41 40 | 13 12 | 7 | 6 | 5 | 4 | 3 | 2 | 1 | 0

FIG 11

Tag: G | FR | Context | — | VA_tag<63:22>
bits: 63 | 62 61 | 60 | 48 47 | 42 41 | 0

Data: V | Size | NFO | IE | Soft2 | Diag | PA<40:13> | Soft | L | CP | CV | E | P | W | G
bits: 63 | 62 61 | 60 | 59 | 58 | 50 49 | 41 40 | 13 12 | 7 | 6 | 5 | 4 | 3 | 2 | 1 | 0

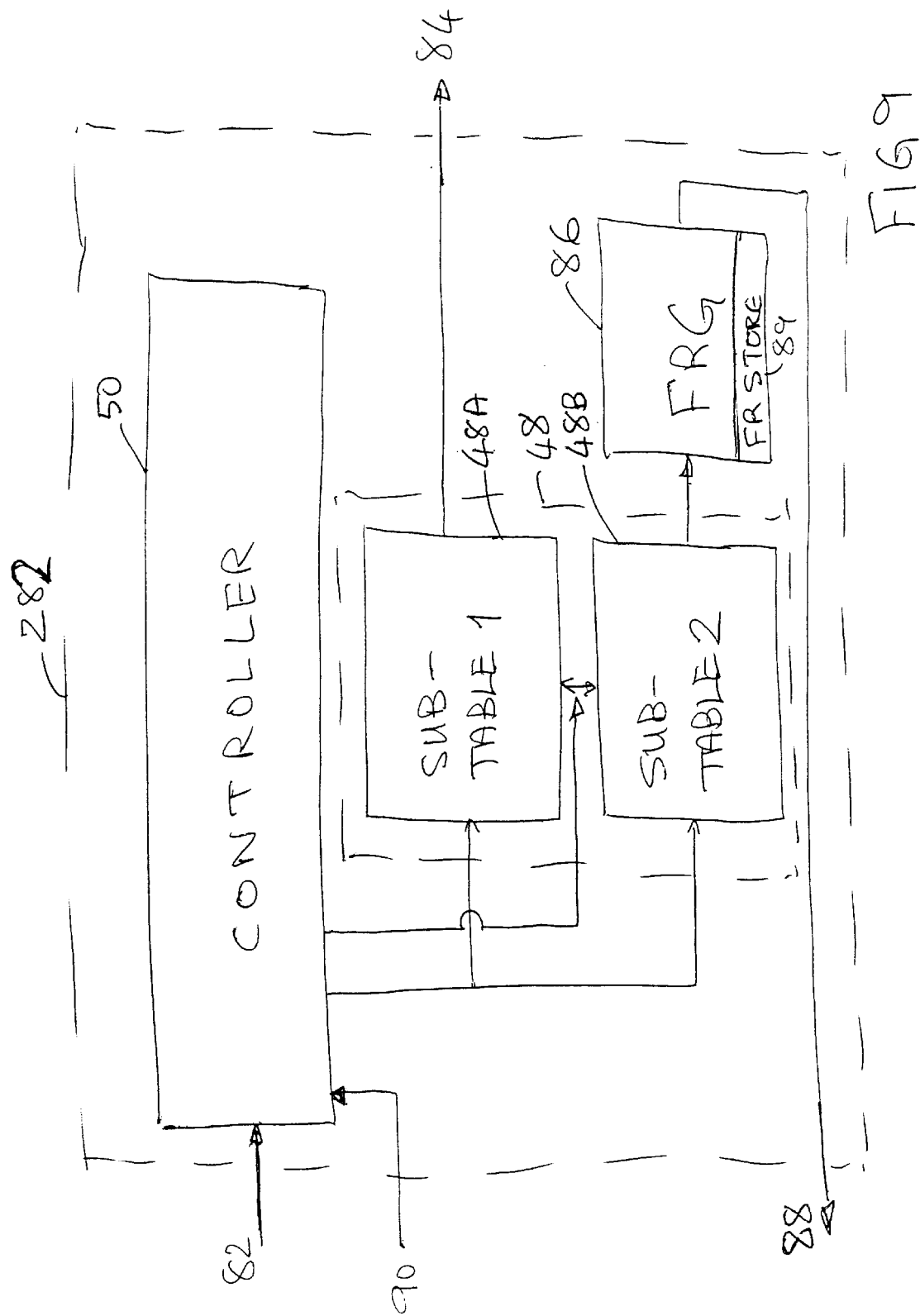

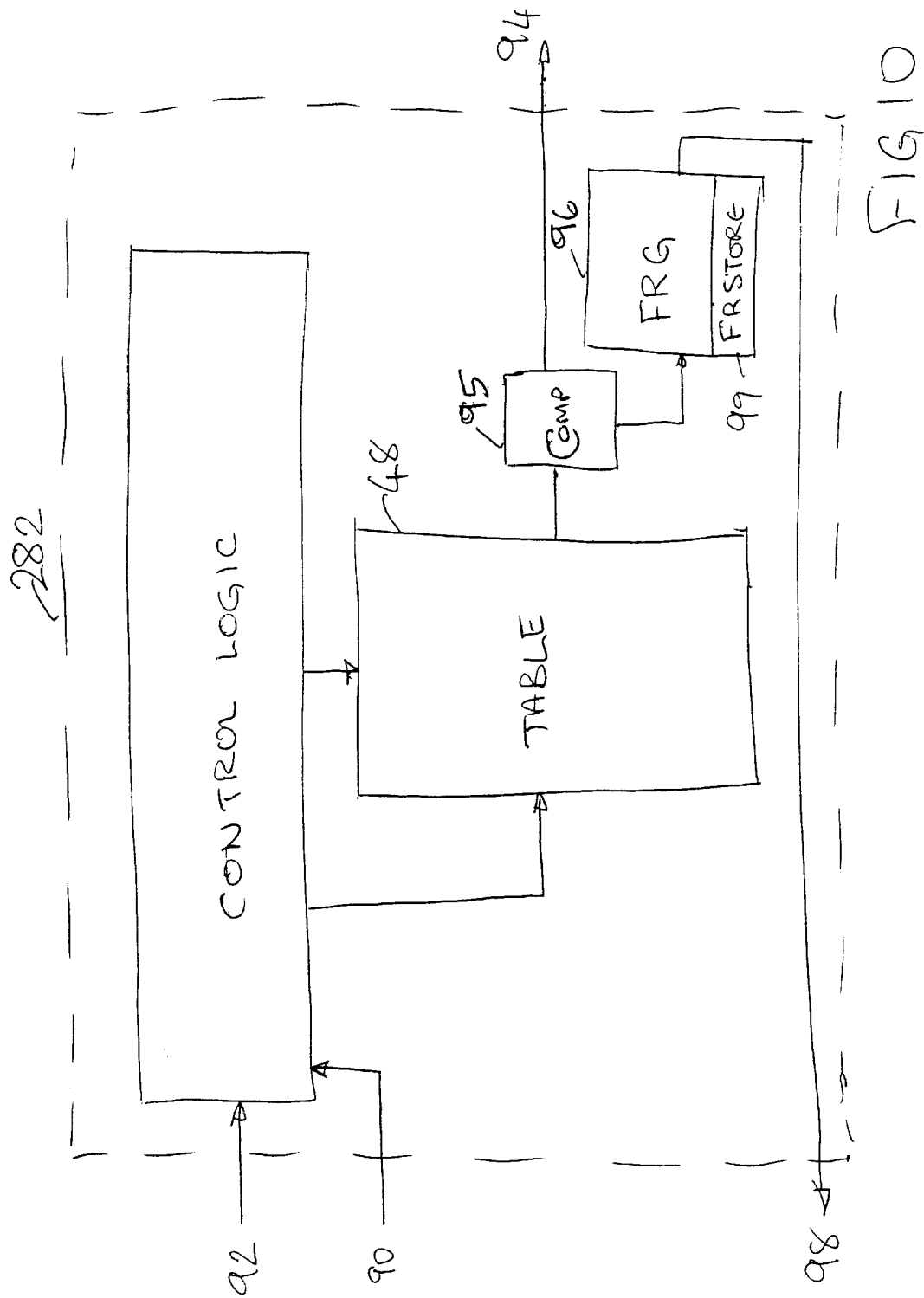

BUS BRIDGE RESOURCE ACCESS CONTROLLER

BACKGROUND OF THE INVENTION

The invention relates to the control of access to system resources in a computer system.

A problem that the present invention addresses is the control of access to resources in a computer system in the event of an error related to the resource to be accessed. The resource can be, for example, a memory location or a block of memory, a memory device, a peripheral device, etc. The error can be as a result of a failure of the resource itself, or a failure along the communication path from the processor to the resource or faulty programming of an application program or of an operating system.

U.S. Pat. No. 5,627,965 describes a fault tolerant computer system including a central processor sub-system and a plurality of other subsystems, the subsystems being connected via a main data transfer bus. The central processor subsystem comprises three central processor modules. Each central processor module (or CPUset) includes a central processing unit (CPU) connected to a private bus, a first bus interface connecting the private bus to a shared bus, and a second bus interface connecting the shared bus to the main bus. The CPUsets are connected over respective private buses to a shared bus. Connected to the shared bus is a slot response memory. The slot response memory includes locations corresponding to respective slots for subsystems on the main bus. According to column 15 of U.S. Pat. No. 5,627,965, where a subsystem in a slot is functioning correctly, a location in the slot response memory corresponding to that slot will contain '0' data and the slot response register will not interfere with data transfers on the main bus. Where the subsystem in a slot becomes defective or absent from the system, then the location in the slot response memory corresponding to that slot is set to '1' and all subsequent attempts to access the defective or absent subsystem will result in artificial termination of the data transfer attempt.

PCT application PCT/US99/12605 is directed to a bridge for a fault tolerant computer system, which bridge connects I/O buses of first and second processing sets to a common I/O device bus. A resource control mechanism in the bridge provides an interface for exchanging signals with one or more resource slots of the device bus, each of the resource slots being capable of communicating with a system resource. The resource control mechanism in the bridge also includes a register associated with each system resource, the register having switchable indicia that indicate an operating state of the associated system resource. The control mechanism is operable in use to direct signals to and/or from respective system resources of the computer system.

The prior arrangements for resource access control as described above have required the provision of a specific arrangement to achieve this, and particularly in the context of a fault tolerant computing system. As a result, such resource access control arrangements are not generally applicable to more conventional computer systems.

An aim of the present invention is to provide an improved approach to resource access control that is applicable to many types of computer systems.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In one aspect, the invention provides a resource access controller for a computer system including at least one central processing unit. The resource access controller controls access to resources addressed by at least one said central processing unit. The resource access controller includes an address translation mechanism operable to provide a translation of received addresses and to provide a fake response identification as to whether or not a response for a received address associated therewith is to be faked. It further includes a fake response generator operable to generate a faked response where a fake response identification indicates that a response is to be faked.

In accordance with an embodiment of the invention, therefore, a resource access controller is able to associate fake response indications with a resource and to generate a fake response when an attempt is made to access a resource labeled such that a faked response should be returned. An embodiment of the invention is able to halt an attempt to access a faulty resource and to fake a response to such an access attempt in a rapid manner as part of an address translation mechanism.

In one embodiment, the address translation mechanism can be arranged to have a plurality of address translation entries for translating received addresses. Each address translation entry is associated with one or more addresses and provides a fake response identification as to whether or not a response for a received address associated therewith is to be faked. The fake response generator can then be operable to generate a faked response where a fake response identification of an address translation entry for a received address indicates that a response is to be faked.

The resource access controller can form part of a bridge that interconnects a first bus connected to a processor of the computer system, which processor includes at least one said central processing unit, and at least a second bus. However, the resource access controller can be provided at other points in a computer system where an address translation is performed, for example in a memory management unit.

The labeling as to whether or not a faked response is to be generated can then be achieved by means of an address translation mechanism. Each translation entry can be configured to provide an indication as to whether a faked response should be returned or not when use is made of the translation entry.

The address translation mechanism can be configured using an associative memory containing the plurality of translation entries. The address translation mechanism can, moreover, be configured using a translation look-aside buffer.

Each translation entry can include a plurality of translation status indicators.

A first buffer can be provided for translation entries for translations not to be faked and a second buffer can be provided for translation entries for translations to be faked. The indication of whether a faked response is to be generated or not can be derived from the buffer in which the translation entry is located.

Alternatively, a buffer can be provided for translation entries for both translations not to be faked and translations to be faked, each translation entry including a fake response status identifier indicating whether or not a response for the corresponding address translation is to be faked.

In an alternative embodiment, the address translation mechanism can be operable to provide a translation of received addresses by decoding a first subset of bits of a received address and, on identifying a predetermined combination of those bits, to pass a further subset of bits of the received address if a fake response identification indicates that a response for a received address is not to be faked.

In operation of an embodiment of the invention, an access can be halted where the fake response identification of the translation entry for an address translation for the access indicates that a response is to be faked. The fake response generator can then be operable to return a faked response to the processor. The fake response generator can also be operable to substitute a known good address for the received address for the access.

As an embodiment of the invention is implemented using an address translation mechanism, and an address translation mechanism will typically form part of many computing systems, the invention finds wide applicability. Thus, an embodiment of the invention can find applicability to computing systems including one or more processors and to computing systems designed specifically to be fault tolerant and to computing systems for more general use.

In another aspect, the invention provides a computer system including a resource access controller as set out above, at least one processor that includes at least one central processing unit, memory and at least one peripheral device, the resource access controller controlling access by at least one central processing unit of at least one processor to the memory and the peripheral device.

In a further aspect, the invention provides a method of managing processor access to resources in a computer system. The method includes steps of: holding in an address translation mechanism, a plurality of address translation entries for translating received addresses, each address translation entry being associated with one or more addresses and providing a fake response identification as to whether or not a response for a received address associated therewith is to be faked; and selectively generating a faked response where a fake response identification of an address translation entry for a received address indicates that a response is to be faked.

DESCRIPTION OF THE PREFERRED EMBODIMENTS

Exemplary embodiments of the present invention will be described hereinafter, by way of example only, with reference to the accompanying drawings in which like reference signs relate to like elements and in which:

FIG. 8 illustrates a translation table entry for the memory management unit referred to with reference to FIG. 7;

FIG. 9 is a schematic block diagram of parts of a memory management unit of a first exemplary implementation of the invention;

FIG. 10 is a schematic block diagram of parts of a memory management unit of a second exemplary implementation of the invention;

FIG. 11 illustrates a table entry for the memory management unit of FIG. 10;

DESCRIPTION OF PARTICULAR EMBODIMENTS

Exemplary embodiments of the present invention are described in the following with reference to the accompanying drawings.

Figure 1:
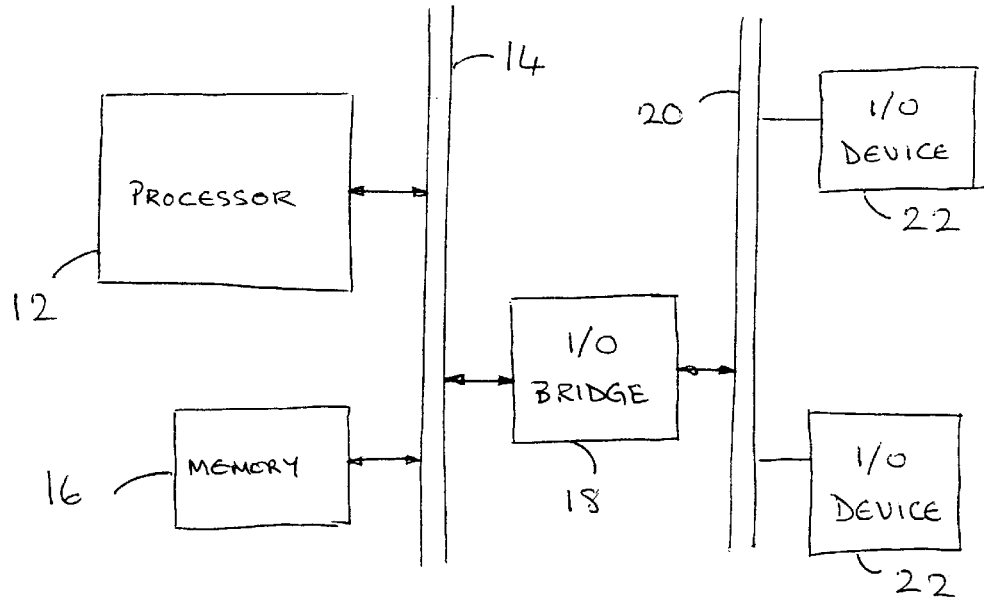
FIG. 1 is a schematic overview of a computer system.

FIG. 1 is an overview of a computer system 10 that includes a processor 12, a processor bus 14 to which are attached a plurality of subsystems including memory 16 and an I/O bridge 18. The processor 12 can typically be integrated in a single integrated circuit. The I/O bridge 18 provides an interface between the processor bus 14 and an I/O bus 20 to which a plurality of I/O devices 22 can be connected.

Figure 2:
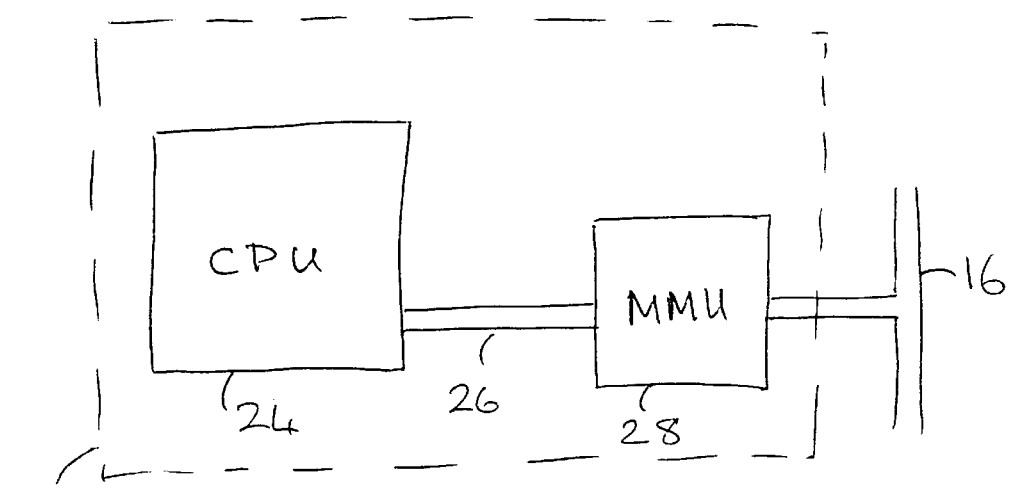
FIG. 2 is a schematic overview of a processor of the computer system of FIG. 1.

FIG. 2 is a schematic overview of a processor such as the processor 12 of FIG. 1. This includes a central processing unit (CPU) 24 connected via an internal bus 26 to a memory management unit (MMU) 28. The CPU 24 is operable to output virtual addresses on the internal bus 26 that are then converted by the MMU 28 into physical addresses for accessing system resources including the memory 16 and the I/O devices 22.

Figure 3:
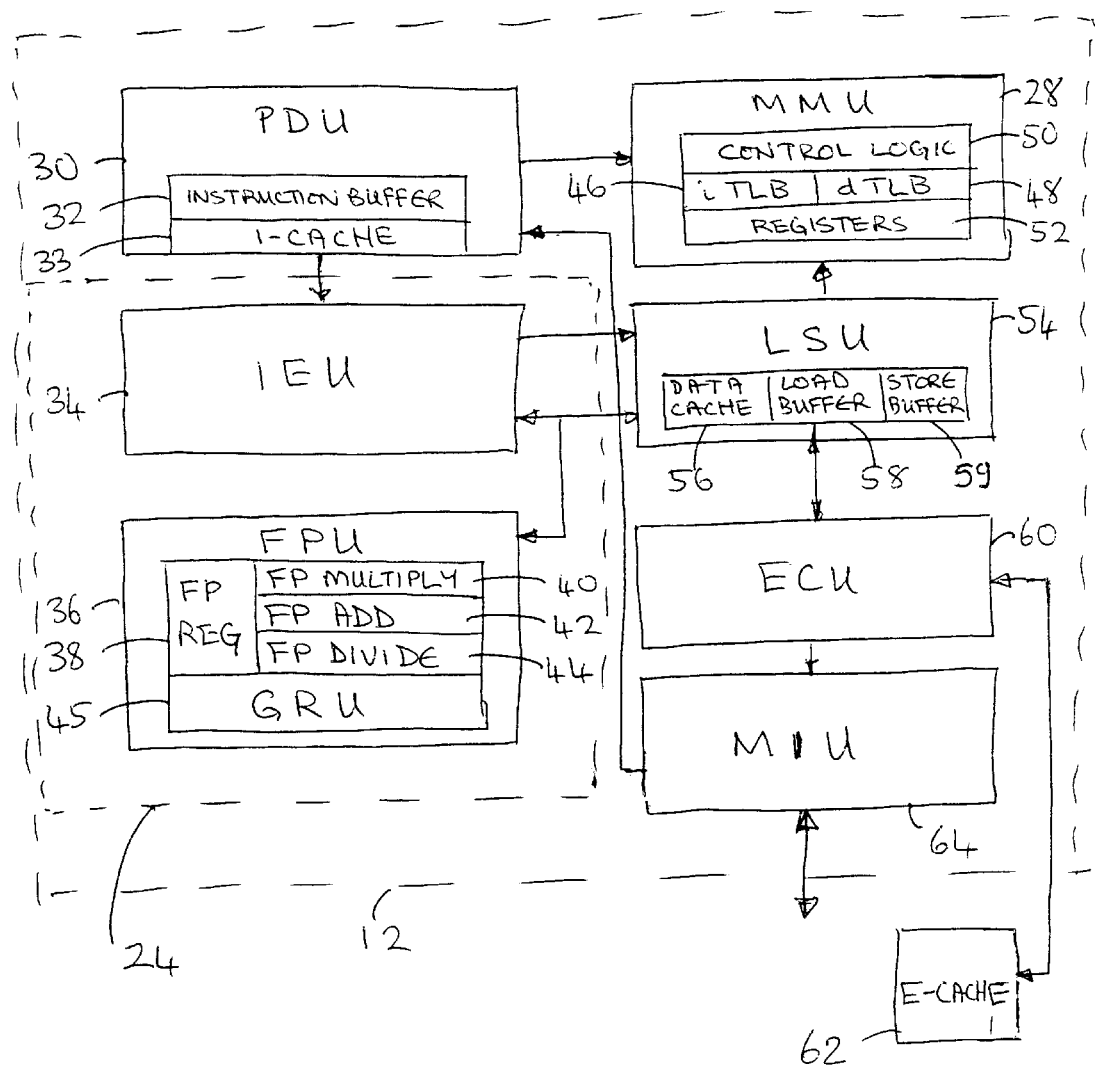
FIG. 3 is a schematic block diagram of a known type of processor.

FIG. 3 is a schematic block diagram of one type of processor 12, namely an UltraSPARC™ processor marketed by Sun Microsystems, Inc. Further details of the UltraSPARC™ processor can be found, for example, in the UltraSPARC™ I&II User's Manual, January 1997, available from Sun Microsystems, Inc, the content of which is incorporated herein by reference. The present invention can be implemented in a processor having the general overall structure of FIG. 3, although it should be appreciated that the invention could equally be implemented in processors having other structures.

In order to explain the present invention, there follows a description of the processor shown in FIG. 3.

The UltraSPARC™ processor is a high-performance, highly integrated superscalar processor implementing a 64-bit architecture. The processor pipeline is able to execute up to four instructions in parallel.

A Prefetch and Dispatch Unit (PDU) 30 fetches instructions before they are actually needed in the pipeline, so the execution units do not starve for instructions. Prefetched instructions are stored in the Instruction Buffer 32 until they are sent to the rest of the pipeline. An instruction cache (I-cache) 33 is a 16 Kbyte two-way set associative cache with 32 byte blocks.

An Integer Execution Unit (IEU) 34 includes two arithmetic logic units (ALUs), a multi-cycle integer multiplier, a multi-cycle integer divider, eight register windows, four sets of global registers (normal, alternate, MMU, and interrupt globals) and trap registers.

A Floating-Point Unit (FPU) 36 is partitioned into separate execution units, which allow two floating-point instructions to be issued and executed per cycle. Source and result data are stored in a 32-entry Floating Point (FP) register file (FP Reg) 38. FP multiply 40, FP Add 42 and FP Divide 44, are all catered for. A Graphics Unit (GRU) 45 provides a comprehensive set of graphics instructions.

The Memory Management Unit (MMU) 28 provides mapping between a 44-bit virtual address and a 41-bit physical address. This is accomplished through a 64-entry instructions translation look-aside buffer (iTLB) 46 for instructions and a 64-entry data translation look-aside buffer (dTLB) 48 for data under the control of MMU control logic 50. Both TLBs are fully associative. The control logic 50 also provides hardware support for a software-based TLB miss strategy. A separate set of global registers 52 is available to process MMU traps.

A Load/Store Unit (LSU) 54 is responsible for generating the virtual address of all loads and stores for accessing a data cache (D-Cache) 56, for decoupling load misses from the pipeline through a load buffer 58, and for decoupling stores through a store buffer 59.

An External Cache Unit (ECU) 60 handles I-Cache 33 and D-Cache 56 misses efficiently. The ECU 60 can handle one access per cycle to an External Cache (E-Cache) 62. The ECU 60 provides overlap processing during load and store misses. For instance, stores that hit the E-Cache 62 can proceed while a load miss is being processed. The ECU 60 can process reads and writes and also handle snoops. Block loads and block stores, which load/store a b 64-byte line of data from memory to the floating-point register file, are also processed by the ECU 60 to provide high transfer bandwidth without polluting the E-Cache 62.

A Memory Interface Unit (MIU) 64 handles all transactions to the system controller, for example, external cache misses, interrupts, snoops, writebacks, and so on.

Figure 4:
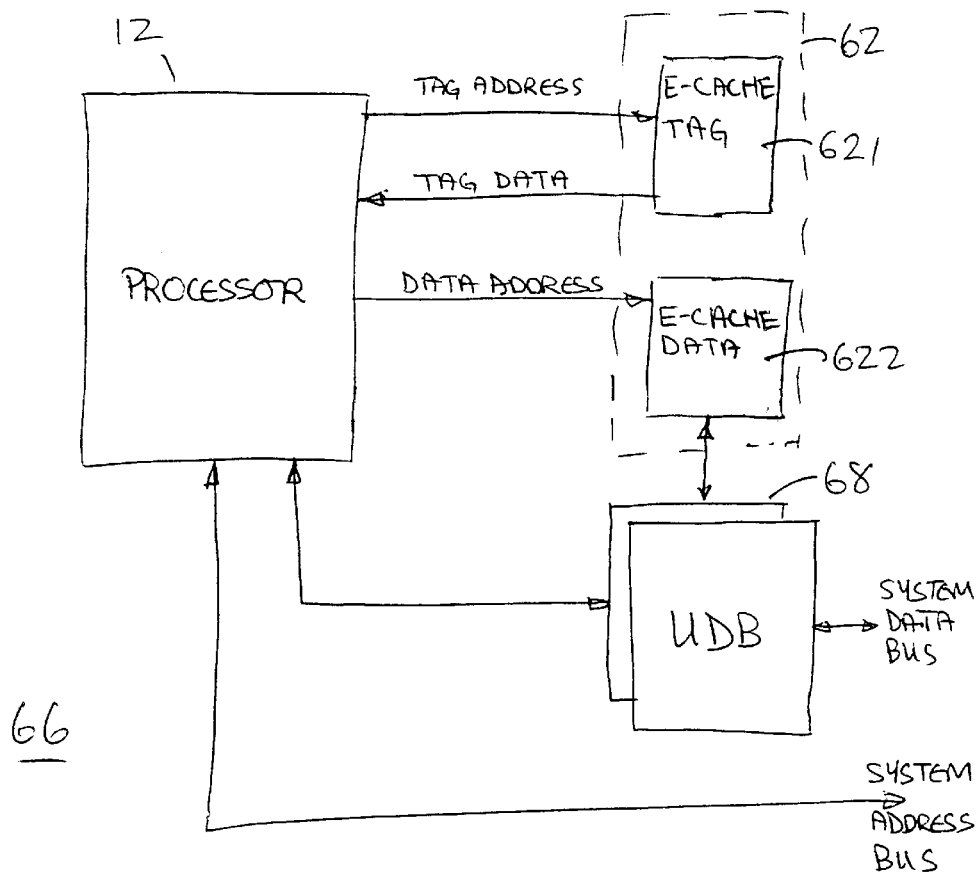
FIG. 4 is a schematic overview of a subsystem including the processor of FIG. 3.

FIG. 4 is a schematic overview of the UltraSPARC™ processor subsystem 66, which comprises the UltraSPARC™ processor 12, synchronous SRAM components for E-Cache tags and data 621 and 622, and two UltraSPARC™ data buffer (UDB) 68 chips. Typically, the processor 12 will be integrated in a single integrated circuit. The UDBs 68 isolate the E-Cache 62 from the system, provide data buffers for incoming and outgoing system transactions, and provide error correction code (ECC) generation and checking.

Figure 5:
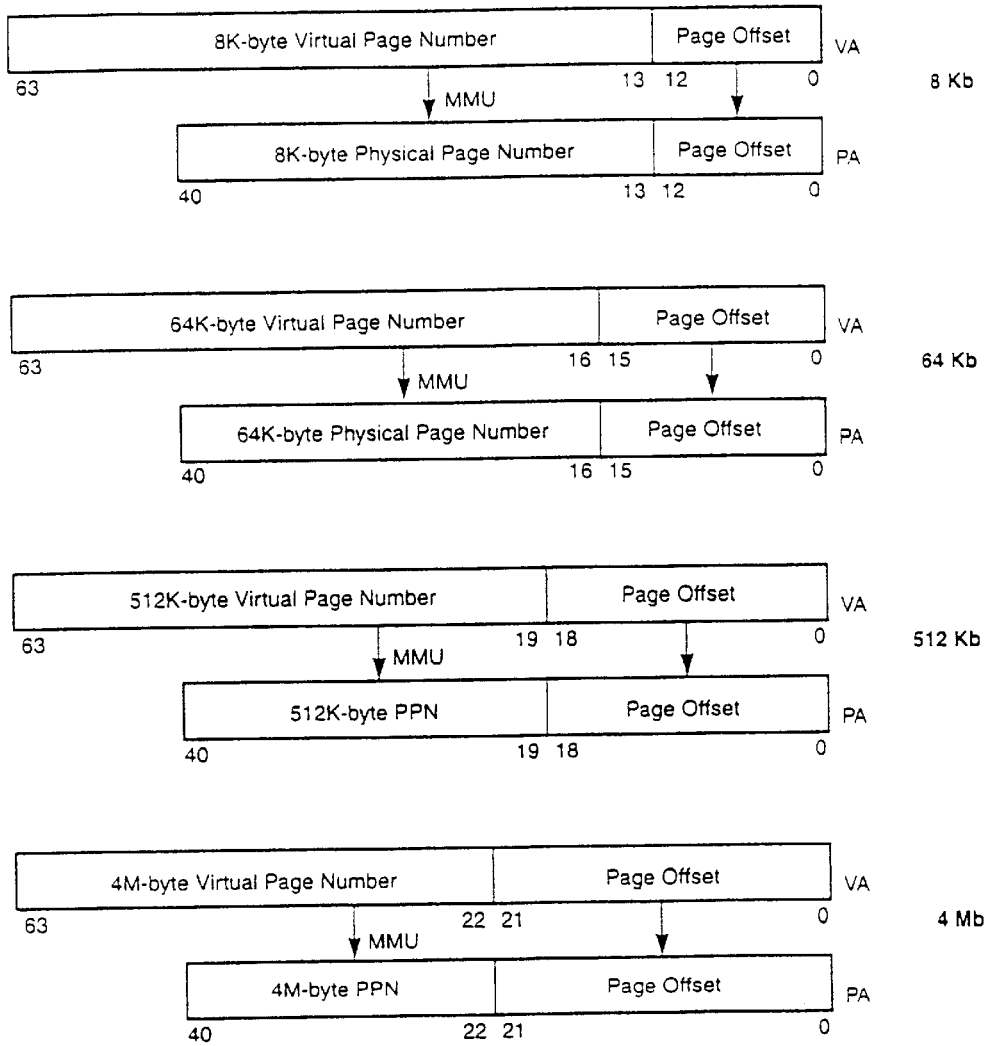
FIG. 5 illustrates virtual to physical address translation for the processor of FIG. 3.

There now follows a description of the Memory Management Unit (MMU) 28 as it is seen by operating system software. In this example, a 44-bit virtual address space is supported with 41 bits of physical address. During each processor cycle the MMU 28 provides one instruction and one data virtual-to-physical address translation. In each translation, the virtual page number is replaced by a physical page number, which is concatenated with the page offset to form the full physical address, as illustrated in FIG. 5 for each of four page sizes, namely 8 Kb, 64 Kb, 512 Kb, and 4 Mb. It should be noted that this Figure shows a full 64-bit virtual address, even though only 44 bits of Virtual Address (VA) are supported, as mentioned above.

Figure 6:
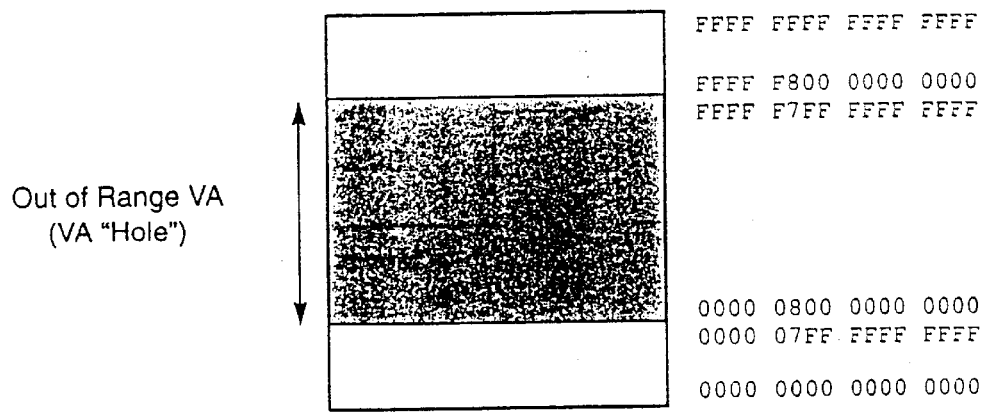
FIG. 6 illustrates an example of the relationship between virtual and physical address space for the processor of FIG. 3.

44-bit virtual address space is implemented in two equal halves at the extreme lower and upper portions of the full 64-bit virtual address space. Virtual addresses between 0000 0800 0000 0000$_{16}$ and FFFF F7FF FFFF FFFF$_{16}$, inclusive, are termed "out of range" and are illegal for the UltraSPARC™ virtual address space. In other words, virtual address bits VA<63:44> must be either all zeros or all ones. FIG. 6 illustrates the UltraSPARC™ virtual address space.

Figure 7:
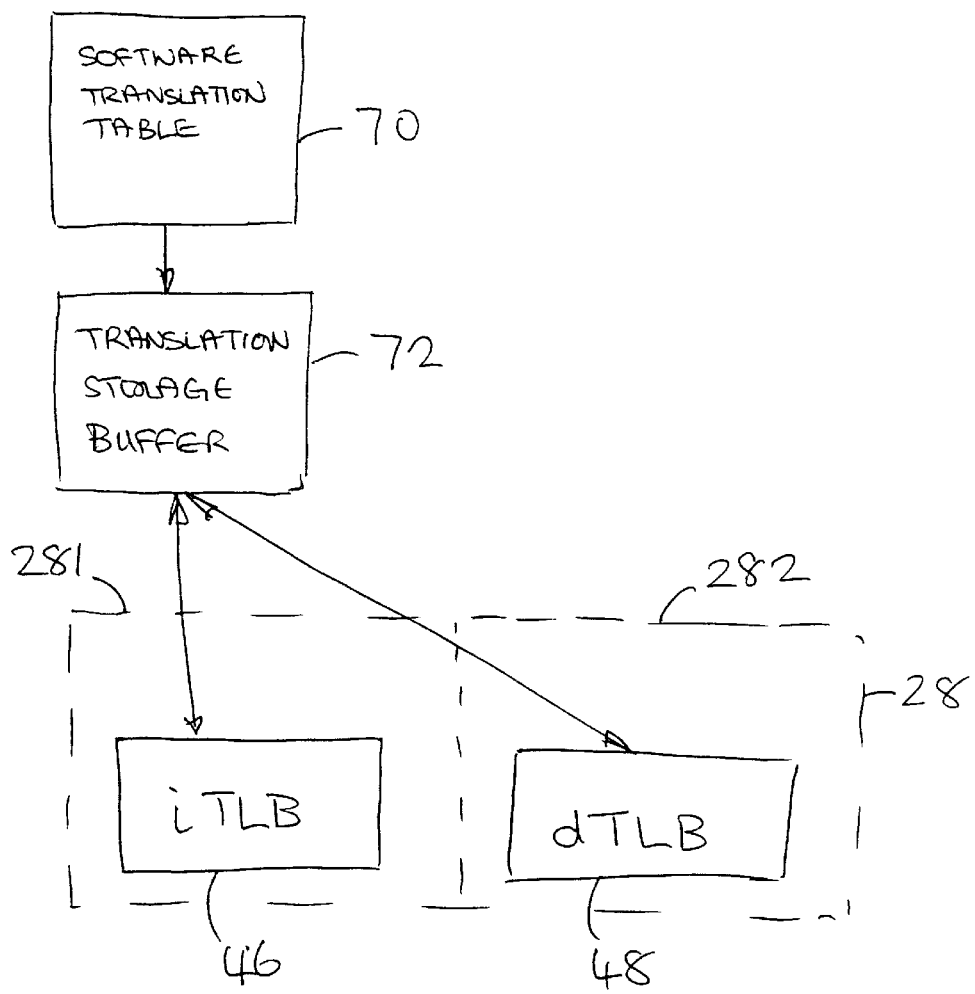
FIG. 7 is a schematic block diagram illustrating a software view of an example of the memory management unit of the processor of FIG. 3.

FIG. 7 is a block diagram illustrating the software view of the MMU 28. The operating system maintains translation information in a data structure called the Software Translation Table (STT) 70. The MMU 28 is effectively divided into an instruction MMU (I-MMU) 281 and a data MMU (D-MMU) 282. The I-MMU 281 includes the hardware instructions Translation Lookaside Buffer (iTLB) 46 and the D-MMU 282 includes the hardware data Translation Lookaside Buffer (dTLB) 48. These TLBs 46 and 48 act as independent caches of the Software Translation Table 70, providing one-cycle translation for the more frequently accessed virtual pages.

The STT 70, which is kept in memory, is typically large and complex compared to the relatively small hardware TLBs 46 and 48. A Translation Storage Buffer (TSB) 72, which acts like a direct-mapped cache, provides an interface between the STT 70 and the TLBs 46 and 48. The TSB 72 can be shared by all processes running on a processor, or it can be process specific.

When performing an address translation, a "TLB hit" occurs when a desired translation is present in the MMU's on-chip TLBs 46/48. A "TLB miss" occurs when a desired translation is not present in the MMU's on-chip TLBs 46/48. On a TLB miss the MMU 28 immediately traps to software for TLB miss processing. A software TLB miss handler has the option of filling the TLB by any means available, but it is likely to take advantage of TLB miss hardware support features provided by the MMU control logic 50, since the TLB miss handler is time critical code.

There now follows more information on the UltraSPARC™ Memory Management Unit (MMU) 28.

An example of an UltraSPARC™ Translation Table Entry (TTE) of the TSB 72 is shown in FIG. 8. This provides a translation entry that holds information for a single page mapping. The TTE is broken into two 64-bit words, representing the tag and data of the translation. Just as in a hardware cache, the tag is used to determine whether there is a hit in the TSB 72. If there is a hit, the data is fetched by software. The functions of fields of the tag and data words are described below.

Tag Word

G—This is a Global bit. If the Global bit is set, the Context field of the TTE is ignored during hit detection. This allows any page to be shared among all (user or supervisor) contexts running in the same processor. The Global bit is duplicated in the TTE tag and data to optimize the software miss handler.

Context—This is a 13-bit context identifier associated with the TTE.

VA-tag<63:22>—The Virtual Address tag is the virtual page number.

Data Word

V—This is a Valid bit. If the Valid bit is set, the remaining fields of the TTE are meaningful.

Size—This is the page size for this entry.

NFO—This is No-Fault-Only bit. If this bit is set, selected specific loads are translated, but all other accesses will trap with a data_access_exception trap.

IE—This is an Invert Endianness bit. If this bit is set, accesses to the associated page are processed with inverse endianness from what is specified by the instruction (big-for-little and little-for-big).

Soft<5:0>, Soft2<8:0>—These are software-defined fields provided for use by the operating system. The Soft and Soft2 fields may be written with any value.

Diag—This is a field used by diagnostics to access the redundant information held in the TLB structure. Diag<0>= Used bit, Diag<3:1>=RAM size bits, Diag<6:4>=CAM size bits.

PA<40:13>—This is the physical page number. Page offset bits for larger page sizes in the TTE (PA<15:13>, PA<18:13>, and PA<21:13> for 64 Kb, 512 Kb, and 4 Mb pages, respectively) are stored in the TLB and returned for a Data Access read, but are ignored during normal translation.

L—This is a Lock bit. If this bit is set, the TTE entry will be "locked down" when it is loaded into the TLB; that is, if this entry is valid, it will not be replaced by the automatic replacement algorithm invoked by an ASI store to the Data-In register.

CP, CV—These form cacheable-in-physically-indexed-cache and cacheable-in-virtually-indexed cache bits to determine the placement of data in UltraSPARC™ caches. The MMU does not operate on the cacheable bits, but merely passes them through to the cache subsystem.

E—This is a Side-effect bit. If this bit is set, speculative loads and FLUSHes will trap for addresses within the page, noncacheable memory accesses other than block loads and stores are strongly ordered against other E-bit accesses, and noncacheable stores are not merged.

P—This is a Privileged bit. If this bit is set, only the supervisor can access the page mapped by the TTE. If the P bit is set and an access to the page is attempted when PSTATE.PRIV=0, the MMU will signal an instruction_access_exception or data_access_exception trap (FT=$1_{16}$).

W—This is a Writable bit. If the W bit is set, the page mapped by this TTE has write permission granted. Otherwise, write permission is not granted and the MMU will cause a data$_{access}$_protection trap if a write is attempted. The W-bit in the I-MMU is read as zero and ignored when written.

G—This is identical to the Global bit in the TTE tag word. The Global bit in the TTE tag word is used for the TSB hit comparison, while the Global bit in the TTE data word facilitates the loading of a TLB entry.

The above description of the UltraSPARC™ processor represents an example of a prior art processor. In the following, the application of an embodiment of the invention in the context of such a processor is to be described, it being understood that the invention can equally be applied to processors of alternative designs and configurations.

In an embodiment of the invention, an indication is provided as to whether the address translations represented by the translation entries relate to physical addresses from which a valid response is to be expected, or whether the physical address relates to an address for which a response should be faked. The latter case can occur, for example, where the physical address falls within an address range for a faulty resource.

In preferred embodiments of the invention, this is achieved by providing a fake response identification through the translation entries as to whether or not a response for the corresponding address translation is to be faked. In different embodiments, the fake response indication can be given in different ways.

Where a faulty resource access, as effected for example by a mis-configured or badly written program (or portion of an operating system), is identified by a processor, this is conventionally dealt with by taking a trap. Likewise where accesses are made to faulty or missing peripheral devices, it is conventional for this to be dealt with by a hardware trap or interrupts. These exceptions take time to handle. If exception handling is required for a single faulty access, then this can normally be accommodated without a significant impact on system performance. However, where such faulty accesses are performed repeatedly, this can lead to a significant reduction in performance. Accordingly, by providing a mechanism whereby accesses may be dropped and instead access responses may be faked, the requirement for taking repeated traps and handling repeated exceptions with the consequential logging of exception data in response to repeated faulty accesses to the same resource address can be avoided.

In one embodiment, the instruction and/or data translation look-aside buffers can be split into, for example, a first (non-faked) portion and a second (faked) portion. In this way, the format of the translation entries need not be changed with respect to the prior art, with this organization of the translation entries providing a fake response indication for the translations associated with the translation entries.

In another embodiment, the format of the translation entries can be changed with respect to the prior art to include at least one faked response indicator bit, the setting of which indicates whether a response to is to be faked or not.

In the following description, it is assumed that a single fake response indication is provided for any translation. A response to any access, whether of a read or write or indeed of any other type, will be faked if the faked response indication is that a faked response should be returned. However, it should be understood that the invention can also be extended to provide separate faked response indications for read, write and any other types of access that may be required. Alternatively, or in addition different types of accesses depending on the type of access requester (e.g. user accesses or supervisor accesses) could be identified. More generally, different processes could be provided with separate fake response handling. For example, where a faked response indication is provided by separate portions of the translation look aside buffers, any appropriate number of portions may be provided. Also, for example, where a faked response indication is provided by faked response bits, any appropriate number of faked response bits may be provided. A combination of both approaches can be used where appropriate.

FIG. 9 is a schematic block diagram of the data address translation part 282 of the memory management unit 28 for illustrating a first exemplary implementation of the invention. It is to be understood that an equivalent arrangement having the same basic structure is also provided for the instruction address translation part 281 of the memory management unit 28 shown in FIG. 7. In this implementation, each translation table is split into two sub-tables. Thus, for example, the dTLB 48 of FIG. 7 is split into first and second sub-tables 48A and 48B. In the equivalent instruction address translation portion (not shown), the iTLB 46 of FIG. 7 is also split into first and second sub-tables.

The first sub-table 48A of the dTLB 48 contains translation entries corresponding to data address translations for which responses are to be faked. The second sub-table 48B contains translation entries corresponding to data address translations for which responses are not to be faked. Each of the entries could, for example, have the format described above with reference to FIG. 8, although in other embodiments, the format of the translation entries and the information represented thereby could be different.

The MMU control logic 50 is responsive to a virtual address 82 relating to an intended resource access to look up both of the sub-tables 48A and 48B in parallel. The sub-table 48A/48B in which a match (a hit) occurs determines whether a normal memory access is made or not. Thus, if a match occurs in the first sub-table 48A, then a resource access is made at 84 using the result of the address translation in a conventional manner. However, if a match occurs in the second sub-table 48B, then the resource access is terminated and a fake response generator (FRG) 86 is activated to return a faked response 88 to the CPU in place of the results of a normal access.

Preferably the faked response generator 86 is implemented in hardware in the memory management unit. The fake response generator can include storage (FR storage) 89 containing fake responses to be returned as a faked response.

The placement of a translation entry in the second sub-table 48B can occur in response, for example, to failure of a previous access to the resource concerned. During normal operation in which access to a resource is effected, a valid response will be received within a predetermined time.

As mentioned above, the handling of a single exception in response to a faulty access need not have a significant impact on system performance. Accordingly, the identification of a first faulty access for a given address translation can be left to conventional trap handling. However, the MMU 28 is arranged to be responsive to a faulty access being indicated at 90 to change the faked response indication for the translation entry for the translation concerned to indicate that future accesses for that translation should be faked.

In the arrangement shown in FIG. 9, therefore, where the MMU 28 is notified at 90 of a faulty access for an address translation, the MMU control logic 50 is operable to move the translation entry from the first sub-table 48A to the second sub-table 48B. As a result, subsequent resource access attempts that require the use of that translation will result in the access being terminated and the response generator being operable to return a faked response. Where a subsequent processor read operation is intended, the actual read could be stopped from occurring and a faked read result (e.g., all zeros) could be generated. Where a subsequent processor write is intended, the actual write operation could be stopped from occurring and a faked acknowledgement could be generated.

As an alternative to an approach where entries are moved from one table to the other, each sub-table could contain a complete set of entries, with the valid bit 'V' being set in one of the tables, only, at any one time. The transfer of an entry from one table to another then being effected by swapping the valid bits in the two sub-tables rather than actually moving the entry between sub-tables.

The faked response that is provided includes the faking of any status signals, and in the case of a read operation faked data. The actual data returned by the faked response generator does not in fact matter. The values provided as a faked read response could include all zeros, or random data, or the content of any register, buffer, or any other response. The reason why this does not matter is that any such accesses to a resource for which a faked response is to be generated will follow an initial access which lead to the initial faulty access for which a trap was taken. Exception handling will already be operative to address the initial fault, and the information returned with the subsequent faked response(s) will never be used by the program that generated the initial faulty access.

FIG. 10 is a schematic block diagram of the data address translation part 282 of the memory management unit 28 for illustrating a second exemplary implementation of the invention. It is to be understood that an equivalent arrangement having the same basic structure is also provided for the instruction address translation part 281 of the memory management unit 28 shown in FIG. 7. In this implementation, a translation table 48 is not split as described with reference to FIG. 9. In this implementation the table 48 contains translation entries corresponding to all address translations. In the equivalent instruction address translation portion (not shown), the iTLB 46 of FIG. 7 also contains all relevant translation entries. In this example, each of the entries could, for example, have the format illustrated in FIG. 11. This format corresponds to that described above with reference to FIG. 8, with the exception that a new faked response (FR) indicator is provided in a previously unused portion of the tag word. In the present instance, the FR indicator is one bit, although as described above, it could comprise multiple bits. Also, although the FR indicator is in the tag word as shown in FIG. 11 to take advantage of free space, it could equally be provided in the data word where space is available. Indeed, as will be apparent, the invention is not limited to systems with table entries of the format shown, and in other embodiments, the table entry format and the rest of the information represented thereby could be different.

Thus the FR indicator provides a bit indicating whether or not an access should be carried out for the translation concerned, or whether the access should be prevented and instead a fake response be returned. In the present example a zero indicates that the access should be carried out and a one indicates that the access should be stopped and the response faked. Of course, the values could be reversed in other embodiments.

The MMU control logic 50 is responsive to a virtual address 92 relating to an intended resource access to look up the table 48. The setting of the FR bit in the table entry that provides a match (a hit) determines whether a normal memory access is made or not. Thus, if the FR bit has a first value (e.g. 0) in the table entry in the table 48 that provides a match, then a resource access is made at 94 using the result of the address translation in a conventional manner. If the FR bit has a second value (e.g. 1) in the table entry in the table 48 that provides a match, then the resource access is terminated and a fake response generator 86 is activated to return a faked response at 98 to the CPU in place of the results of a normal access. Logic 95 is responsive to the setting of the FR bit in the table entry in which a match occurs to block the normal resource access from proceeding and to activate the fake response generator 96.

The setting of the FR indicator in the table entry corresponding to a given translation entry in the table 48 can occur in response, for example, to failure of a previous access to the resource concerned. As mentioned above, the handling of a single exception in response to a faulty access need not have a significant impact on system performance. Accordingly, the identification of a first faulty access for a given address translation can be left to conventional trap handling. However, in the arrangement shown in FIG. 10, where the MMU 28 is notified at 90 of a faulty access for an address translation, the MMU control logic 50 is operable to change the value of the FR bit for the table entry concerned in the table 48. Thus, where a requirement for a faked response is one, the faked response indicator is changed from 0 to 1. As a result, subsequent resource access attempts that require the use of that translation will result in the access being terminated and the response generator being operable to return a faked response. Where a subsequent processor read operation is intended, the actual read could be stopped from occurring and a faked read result (e.g., all zeros) could be generated. Where a subsequent processor write is intended, the actual write operation could be stopped from occurring and a faked acknowledgement could be generated.

As with the arrangement described with reference to FIG. 9, the actual response returned by the faked response generator does not in fact matter, and for the same reasons. Accordingly, the faked read response can be in the form of all zeros, or any other content of a register, or buffer, a random number, or any other response. For example the response could be generated from values storage in the FR storage 99.

In the above described embodiments of the invention, the resource access control is provided using an address translation mechanism in a processor, for example in the processor's memory management unit. However, the benefits of the invention can also be achieved using address translation mechanisms at other parts of the computer system. One such example is in a bridge such as the I/O bridge 18 between the buses 14 and 20.

Figure 12:
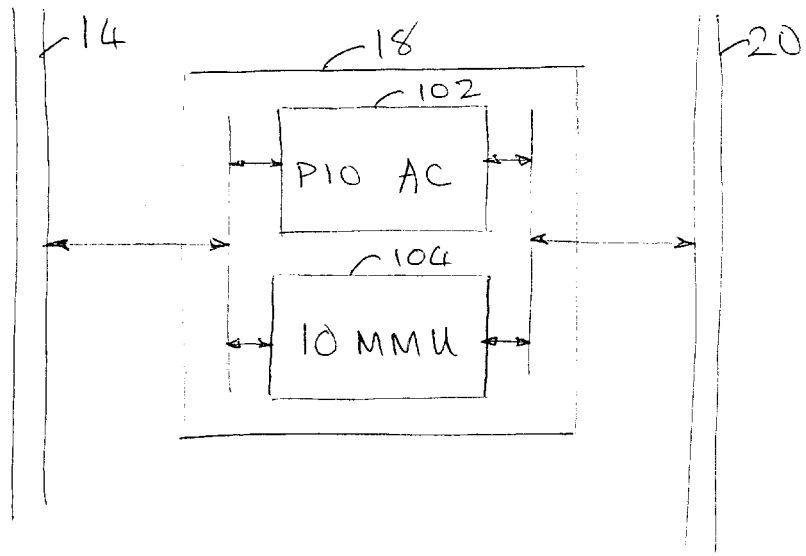
FIG. 12 is a schematic block diagram of a bridge between buses of a computer system as in FIG. 1 of an alternative embodiment of the invention.

FIG. 12 is a schematic block diagram representing relevant parts of the I/O bridge 18 positioned between the processor bus 14 and an I/O bus 20. The bridge includes a processor I/O (PIO) access controller 102 for controlling address translations for resource access requests including processor bus addresses received from the processor bus 14. It also includes an I/O memory management unit (IOMMU) 104 for controlling I/O address translations for resource access requests including I/O addresses received from the I/O bus 20.

Figure 13:
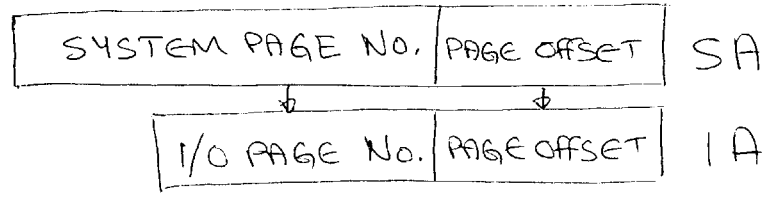
FIG. 13 illustrates a virtual address to I/O address translation.

The PIO access controller 102 is operable to convert between a system address (SA) received from the processor bus and an I/O bus address (IA), as represented in FIG. 13. The system address comprises a system page number (bits 40-13) and a page offset (bits 12-0). The I/O address (IA) comprises an I/O page number (bits 31-13) and a page offset (bits 12-0).

Figure 14:
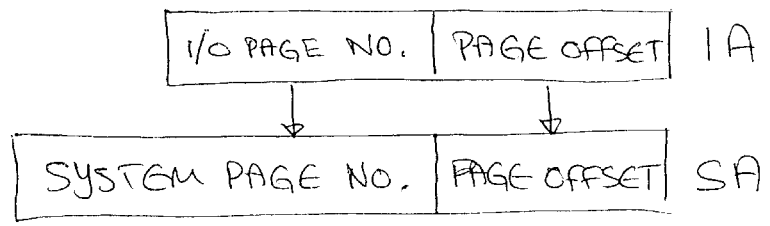
FIG. 14 illustrates a I/O address to physical address translation.

The IOMMU 104 is operable to convert between an I/O address (IA) received from the I/O bus and a system address (SA), as represented in FIG. 14. The I/O address (IA) comprises an I/O page number (bits 31-13) and a page offset (bits 12-0). The system address (SA) comprises a system page number (bits 40-13) and a page offset (bits 12-0).

Figure 15:
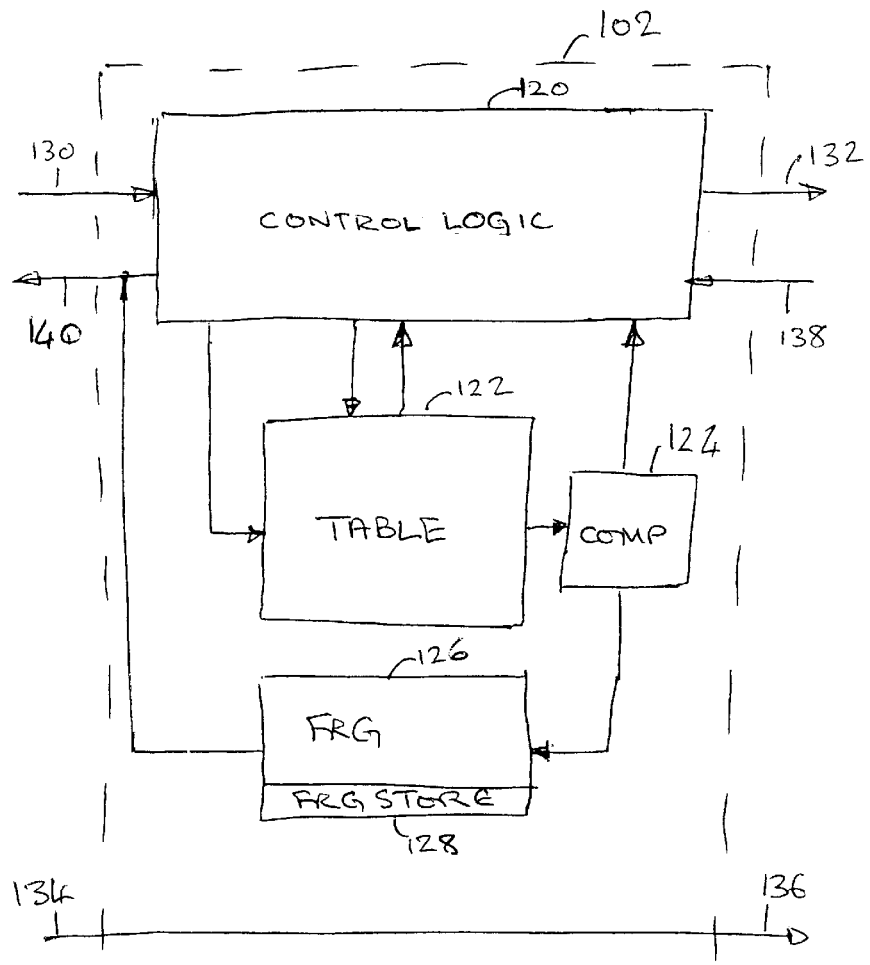
FIG. 15 illustrates a processor access controller of the bridge of FIG. 12.

FIG. 15 is a schematic block diagram of the PIO access controller 102 of FIG. 12. The PIO access controller 102 includes control logic 120 that is responsive to the system page number of the system address (SA) received at 130 to convert this to a corresponding I/O address (IA) using a stored translation record 122. The stored translation record 122 can be implemented as a translation table, for example a translation look-aside buffer, although other forms of record could also be used. In this example, a translation table 122 contains a plurality of entries, each associated with a system page number. Each entry can have the format illustrated in FIG. 16.

Figure 16:
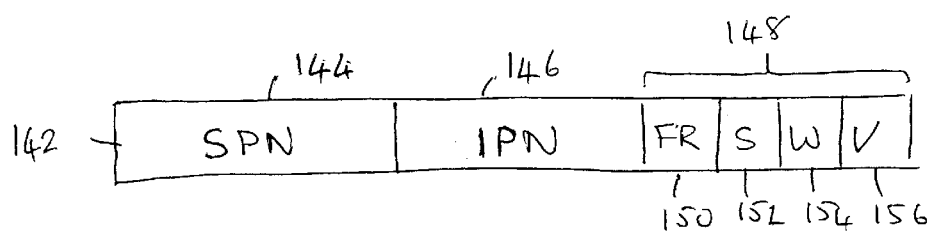
FIG. 16 illustrates a translation entry for the access controller of FIG. 15.

As shown in FIG. 16, each entry in the translation table identifies a system page number (SPN) 144, the corresponding I/O page number (IPN) 146 and a plurality of control indicators (e.g. control bits) 148. In the example shown, there a four control indicators. A faked response (FR) indicator 150 indicates whether or not a response for an address having the corresponding system page number should be faked. A supervisor (S) indicator 152 indicates whether or not an address having the corresponding system page number is for supervisor access only. A writable (W) indicator 154 indicates whether or not an address having the corresponding system page number is available for write access. A valid (V) indicator 154 indicates whether or not an address having the corresponding system page number is valid.

The control logic 120 is responsive to receipt of a system page number to access the translation table 122 to extract a corresponding I/O page number and the control indicators. The control indicators are passed via comparison logic 124 to determine the status of the indicators for validating the access. If the control indicators indicate that the access may proceed, the control logic is operable to cause the I/O page number to be output at 132. The page offset of the system address (SA) is received by the PIO access controller 102 at 134 and is output at 136 to be used with the I/O page number to form the I/O address (IA).

If, however, the fake response (FR) indicator 150 indicates that a response should be faked for an address having the received system page number, the comparison logic 124 causes a faked response generator 126 to return, at 140, a faked response to the originator of the access request. The faked response can be retrieved from faked response generator storage 128. Where this access was a read access, then suitable response data is also faked. The faked response data can be random, for example all ones or all zeros, as long as the data is does not relate to a data value that would cause an exception.

The control logic 120 is also responsive to real response data received at 138 following an access performed using the system page number and the page offset output at 132/136 by the PIO access controller 102. The control logic 120 is operable to validate the response using conventional validation techniques (e.g. parity or CRC checks or an explicitly negative acknowledge). If the response is valid, then the response is returned at 140 to the originator of the access request. If, however, a response is not received within a predetermined time or the response contains an error (e.g. a parity or CRC error or an explicitly negative acknowledge), then the controller is operable to set the faked response bit 150 is the appropriate entry 142 in the translation table 122. In such a case, an error would be notified to the originator of the original access.

As an alternative, the setting of a faked response bit 150 in a table entry 142 in the table 122 can be instigated by the originator of the original access request on determining that the response was invalid or not received. This can be achieved by sending an instruction to this effect to the control logic 120.

Figure 17:
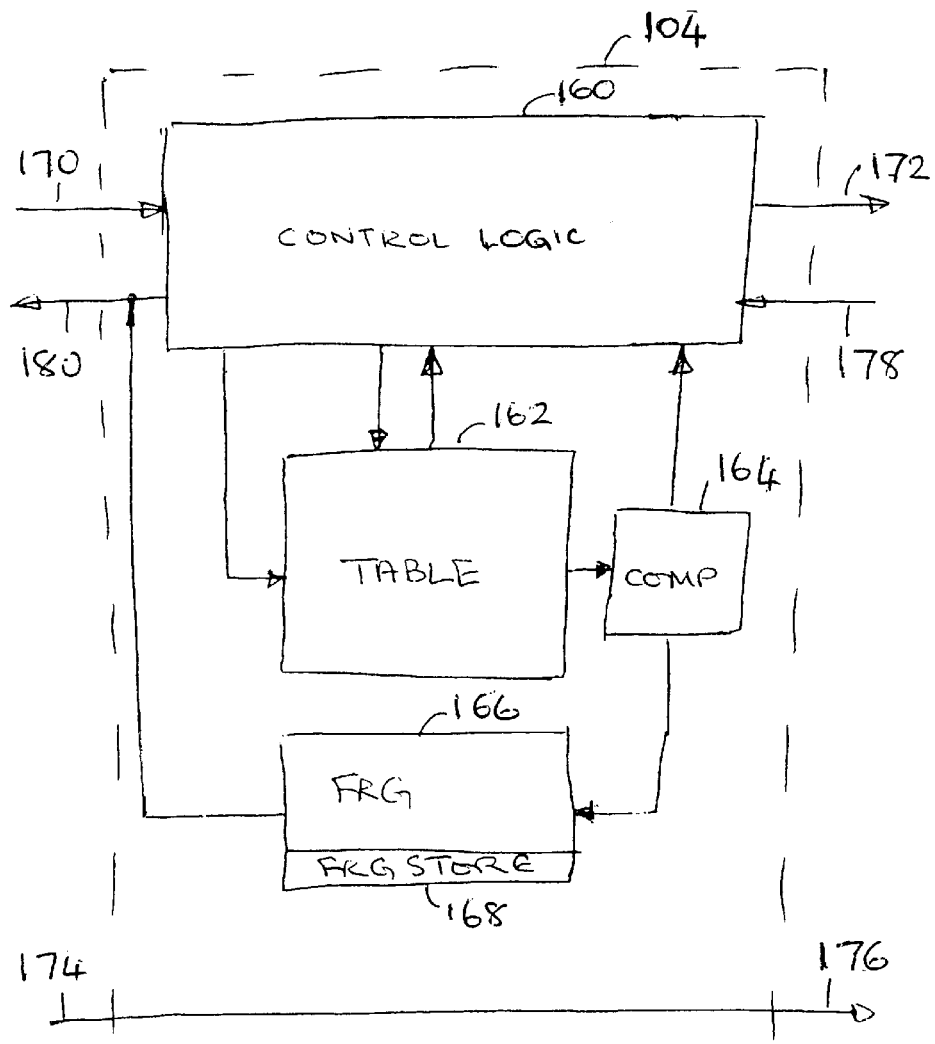
FIG. 17 illustrates an I/O access controller of the bridge of FIG. 12.

FIG. 17 is a schematic block diagram of the IOMMU 104 of FIG. 12. The IOMMU 104 includes control logic 160 that is responsive to the I/O page number of the I/O address (IA) received at 170 to convert this to a corresponding system address (SA) using a stored translation record 162. The stored translation record 162 can be implemented as a translation table, for example a translation look-aside buffer, although other forms of record could also be used. In this example, a translation table 162 contains a plurality of entries, each associated with an I/O page number. Each entry can have the format illustrated in FIG. 18.

Figure 18:
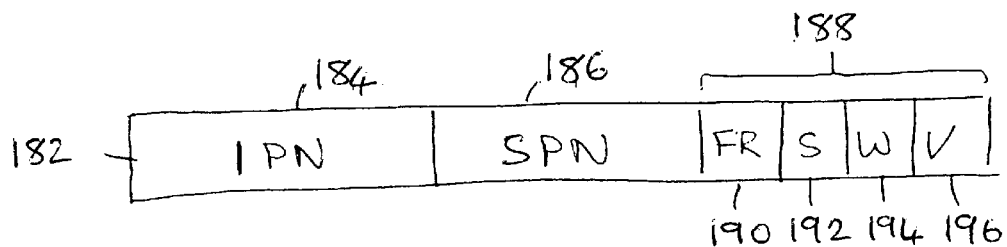
FIG. 18 illustrates a table entry for the access controller of FIG. 17.

As shown in FIG. 18, each entry in the translation table identifies an I/O page number (IPN) 184, the corresponding system page number (PPN) 186 and a plurality of control indicators (e.g. control bits) 188. In the example shown, there are four control indicators. A faked response (FR)

indicator 190 indicates whether or not a response for an address having the corresponding virtual page number should be faked. A supervisor (S) indicator 192 indicates whether or not an address having the corresponding virtual page number is for supervisor access only. A writable (W) indicator 194 indicates whether or not an address having the corresponding virtual page number is available for write access. A valid (V) indicator 194 indicates whether or not an address having the corresponding virtual page number is valid.

The control logic 160 is responsive to receipt at 170 of an I/O page number to access the translation table 162 to extract a corresponding system page number and the control indicators. The control indicators are passed via comparison logic 164 to determine the status of the indicators for validating the access. If the control indicators indicate that the access may proceed, the control logic is operable to cause the system page number to be output at 172. The page offset of the I/O address (IA) is received by the IOMMU 104 at 174 and is output at 176 to be used with the system page number to form the system address (SA).

If, however, the fake response (FR) indicator 190 indicates that a response should be faked for an address having the received I/O page number, the comparison logic 164 causes a faked response generator 166 to return, at 180, a faked response to the originator of the access request. The faked response can be retrieved from faked response generator storage 168. Where this access was a read access, then suitable response data is also faked. The faked response data can be random, for example all ones or all zeros, as long as the data is does not relate to a data value that would cause an exception.

The control logic 160 is also responsive to real response data received at 178 following an access performed using the system page number and the page offset output at 172/176 by the IOMMU 104. The control logic 160 is operable to validate the response using conventional validation techniques (e.g. parity or CRC checks or an explicitly negative acknowledge). If the response is valid, then the response is returned at 180 to the originator of the access request. If, however, a response is not received within a predetermined time or the response contains an error (e.g. a parity or CRC error or an explicitly negative acknowledge), then the controller is operable to set the faked response bit 190 is the appropriate entry 182 in the translation table 162. In such a case, an error would be notified to the originator of the original access.

As an alternative, the setting of a faked response bit 190 in a table entry 182 in the table 122 can be instigated by the originator of the original access request on determining that the response was invalid or not received. This can be achieved by sending an instruction to this effect to the control logic 160. Alternatively, the system could provide for the originator of the DMA action to set the faked response bit 190 in the table entry.

In FIGS. 12 to 18, an embodiment of the invention is described where a translation table along the lines of that described with respect to FIG. 10 is described. In other words, each table entry actually contains a specific bit or bits forming a faked response indicator. However, an approach along the lines of FIG. 9 could also be employed in the embodiment of FIGS. 12 to 18. In other words, two sub-tables could be used, where the buffer in which a given translation entry is found forms the faked response indication. For example, if a translation entry is in a first sub-table, then responses for accesses corresponding to that entry are not to be faked, and if the translation entry is in the other sub-table, then responses for accesses corresponding to that entry are to be faked. Similarly, a mixture of these approaches could be used.

Figure 19:
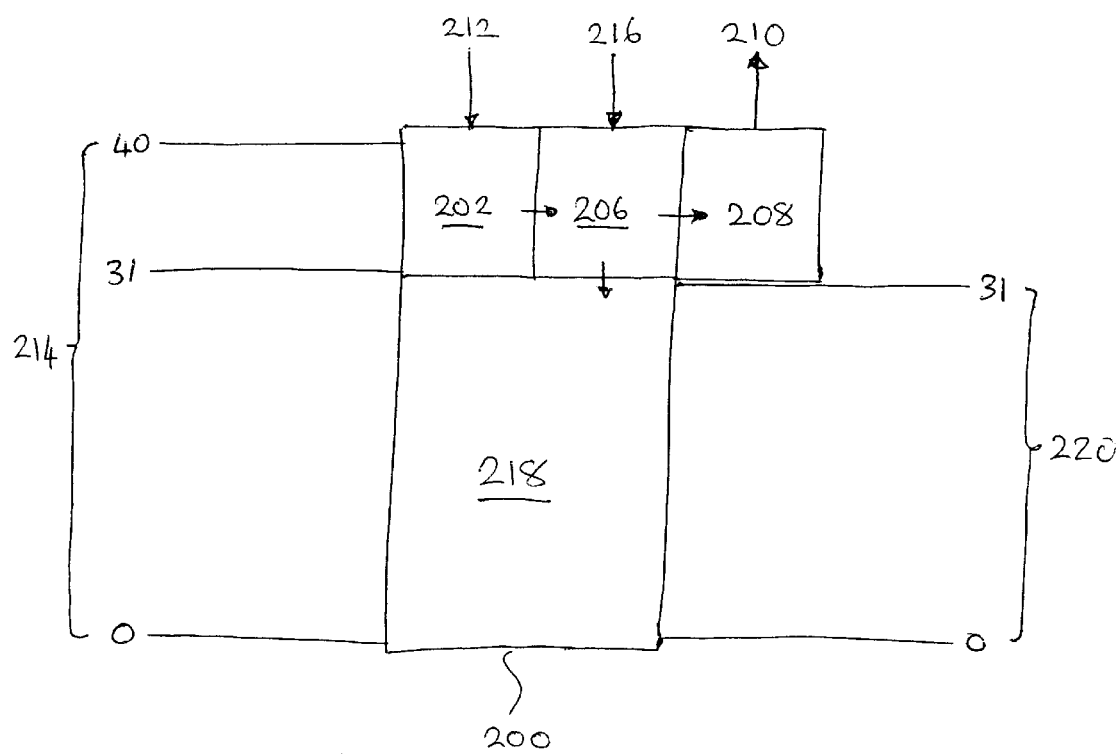
FIG. 19 illustrates a further embodiment of the invention.

In FIG. 19, a further embodiment of the invention is described. In this embodiment, an address translation mechanism 200 provides a bridge between two buses. The first bus 214 that carries 41 bit addresses (bits 0–40). The second bus 220 that carries 32 bit addresses (bits 0–31). The translation mechanism includes an address decoder 202 for decoding a sub-set of bits of from the first bus. In this instance the decoder 202 decodes the 10 highest order bits of the addresses on the first bus. The decoder is programmable via a control input 212 to detect one or more determined combinations of the first set of bits. If the decoder does not detect one of the determined combinations of bits in the subset of bits of a received address, then the address translation mechanism 200 is operable not to output an address on the second bus. If the decoder does detect a match, then the decoder is operable to signal this to a fake response indicator 206 that is settable via a first line 216 to either indicate that a received and recognised address is to be faked, or to indicate that a received and indicated response is not to be faked. If the fake response indicator indicates that a response is to be faked, then the fake response indicator is operable to pass a signal to a fake response generator 208 to return a faked response 210 to the entity that issued the address. If the fake response indicator indicates that a response is not to be faked, then no signal is passed to the fake response generator 208, whereby a faked response 210 is not issued. In the case that a faked response indication is not issued, then a gate 218 is operable to pass a lower order subset of the bits of the first bus 214 to the second bus 220 (in the present instance the lower order bits 0–31). Where the faked response indicator indicates that a faked response is to be sent, the lower order subset of bits of the first address will not normally be passed to the second bus. However, rather than simply blocking the first address, the gate 218 could, for example, be configured in such a situation to issue a predetermined alternative address over the second bus 220.

Accordingly, there has been described an apparatus and a method of providing resource access control in a manner that avoids unnecessary resource accesses where a resource is already known to be faulty. The resource in question can be a memory location, a peripheral or any other addressable system component or subsystem. A resource access controller includes an address translation mechanism providing fake response identification as to whether or not a response is to be faked. The resource access controller also includes a fake response generator for selectively generating a faked response where the fake response identification of the corresponding translation entry indicates that a response is to be faked.

Although particular embodiments of the invention have been described, it will be appreciated that many modifications/additions and/or substitutions may be made within the scope of the invention.

Thus, for example, although the described embodiments employ translation tables, it will be appreciated that the translation entries need not be stored in tabular form, but could be held in any other suitable form, for example in a linked list. Thus for example, where reference is made to a table or sub-table above, this could be replaced by a reference to a list, or sub-list.

Moreover, the invention is not limited to any particular technology for looking up translation entries. For example, where tables are used, these could be fully or set associative as appropriate. As mentioned above, multiple faked response indications may be provided for each translation entry.

Also, rather than simply preventing an access when a fake response identification indicates that a response for a received address associated therewith is to be faked, the faked response generator can be arranged to be operable to substitute a known good address for the received address for the access. The faked response generator can be operable to output a translated address to perform the access, or can be configured to supply the alternative, good address to the address control mechanism. The good address can be held in one or more registers in the fake response generator.

An embodiment of processor according to the invention could be used in both single processor and multiple processor systems.

What is claimed is:

1. A bus bridge resource access controller for a computer system that includes at least one central processing unit and a bus bridge, the resource access controller being operable to control access to resources addressed via the bridge by at least one said central processing unit, the resource access controller comprising:

an address translation mechanism operable to provide a translation of received addresses and to provide a fake response indication as to whether or not a response for a received address associated therewith is to be faked; and a fake response generator operable to generate a faked response where a fake response indication indicates that a response is to be faked.

2. The bus bridge resource access controller of claim 1, wherein the address translation mechanism has a plurality of address translation entries for translating received addresses, each address translation entry being associated with one or more addresses and providing a fake response indication as to whether or not a response for a received address associated therewith is to be faked; and the fake response generator is operable to generate a faked response where a fake response indication of an address translation entry for a received address indicates that a response is to be faked.

3. The bus bridge resource access controller of claim 1, wherein the bridge interconnects a first bus connected to a processor of the computer system which processor includes at least one said central processing unit, and at least a second bus.

4. The bus bridge resource access controller of claim 1, wherein the address translation mechanism includes a translation look-aside buffer.

5. The bus bridge resource access controller of claim 1, wherein the address translation mechanism forms part of a memory management unit.

6. The bus bridge resource access controller of claim 1, wherein the fake response generator forms part of a memory management unit.

7. The bus bridge resource access controller of claim 1, wherein the address translation mechanism comprises an associative memory containing the plurality of address translation entries.

8. The bus bridge resource access controller of claim 1, wherein each address translation entry includes a plurality of translation status indicators.

9. The bus bridge resource access controller of claim 1, wherein the address translation mechanism comprises a first buffer containing address translation entries for addresses for which responses are not to be faked and a second buffer containing address translation entries for addresses for which responses are to be faked, the fake response indication as to whether a faked response is to be generated or not being derived from the buffer in which the address translation entry is located.

10. The bus bridge resource access controller claim 1, comprising a buffer containing address translation entries for both addresses for which translations are not to be faked and for addresses for which responses are to be faked, each address translation entry including a fake response status identifier indicating whether or not a response for the corresponding address translation is to be faked.

11. The bus bridge resource access controller of claim 1, wherein the address translation mechanism is operable to provide a translation of received addresses by decoding a first subset of bits of a received address and, on identifying a predetermined combination of those bits, to pass a further subset of bits of the received address if a fake response indication indicates that a response for a received address is not to be faked.

12. The bus bridge resource access controller of claim 1, wherein an access is prevented there the fake response indication of an address translation entry corresponding to a received address indicates that a response is to be faked, the fake response generator then being operable to return a faked response.

13. The bus bridge resource access controller of claim 1, wherein an access is modified where the fake response indication of an address translation entry corresponding to a received address indicates that a response is to be faked, the fake response generator then being operable to substitute a known good address for the received address for the access.

14. The bus bridge resource access controller of claim 1, wherein the resource is at least one memory location.

15. The bus bridge resource access controller of claim 1, wherein the resource is a peripheral device.

16. The bus bridge resource access controller of claim 1, wherein the resource is a subsystem.

17. A computer system comprising at least one processor that includes at least one centtal processing unit, memory, at least one peripheral device, a bus bridge and a bus bridge resource access controller operable to control acess by at least one said central processing unit of at least one said processor to the memory and the peripheral device, the bus bridge resource access controller comprising:

an address translation mechanism operable to provide a translation of received addresses and to provide a fake response indication as to whether or not a response for a received address associated therewith is to be faked; and a fake response generator operable to generate a faked response where a fake response indication indicates that a response is to be faked.

18. The computer system of claim 17, operable to identify an initial faulty access to a resource.

19. The computer system of claim 18, further operable in response to the initial indication of a faulty resource access to cause the bus bridge resource access controller to set a fake response indication for a corresponding translation entry for said faulty resource access.

20. A method of managing processor access via a bus bridge to resources in a computer system, the method comprising:

providing, in an address translation mechanism in the bridge, a fake response indication as to whether or not a response for a received address associated therewith is be faked; and selectively generating a naked response where the fake response indication the received address indicates that a response is to be faked.

21. The method of claim 20, wherein:

providing a fake response indication includes holding in an address translation mechanism, a plurality of address translation entries for translating received addresses, where each address translation entry is associated with one or more addresses and provides a fake response indication as to whether or not a response for a received address associated therewith is to be faked; and a faked response is generated where a fake response indication of an address translation entry for a received address indicates that a response is to be faked.

22. The method of claim 20, wherein the address translation mechanism comprises a first buffer containing address translation entries for addresses for which responses are not to be faked and a second buffer containing address translation entries for addresses for which responses are to be faked, the method comprising deriving a fake response indication as to whether a faked response is to be generated or not from the buffer in which the address translation entry is located.

23. The method of claim 20, further comprising setting a fake response indication for an addres translation entry on detecting an error in a resource relating to an access using the address translation entry.

24. The method of claim 20, wherein the address translation mechanism provides a translation of received addresses by decoding a first subset of bits of a received address and, on identifying a predetermined combination of those bits, passes a further subset of bits of the received address if a fake response indication indicates that a response for a received address is not to be faked.

25. The method of claim 20, comprising preventing an access where the fake response indication of an address translation entry corresponding to a receive address indicates that a response is to be faked, and returning a faked respons to the processor.

26. The method of claim 20, comprising modifying an access where the fake response indication of an address translation entry corresponding to a received address indicates that a response is to be faked.

27. The method of claim 20, wherein the resource is at least one memory location.

28. The method of claim 20, wherein the resource is a peripheral device.

29. The method claim 20, wherein the resource is a subsystem.

30. A resource acces controller for a computer system including at least one central processing unit, the resource access controller controlling access to resources addressed by at least one said central processing unit, the resource access controller comprising:

an address translation mechanism operable to provide a translation of received addresses and to provide a fake response identification as to whether or not a response for a received address associated therewith is to be faked, wherein the address translation mechanism is operable to provide a translation of received addresses by decoding a first subset of bits of a received address and, on identifying a predetermed combination of those bits, to pass a further subset of bits of the received address if a fake response identification indicates that a response for a received address is not to be faked; and a fake response generator operable to generate a faked response where a fake response identification indicates that a response is to be faked.

31. A method of managing processor access to resources in a computer system, the method comprising:

providing, in an address translation mechanism, a fake response identification as to whether or not a response for a received address associated therewith is to be faked; and selectively generating a faked response where the fake response identification for the received address indicates that a response is to be faked;

wherein the address translation mechanism comprises a first buffer containing address translation entries for addresses for which responses are not to be faked and a second buffer containing address translation entries for addresses for which responses are to be faked, the method comprising deriving a fake response indication as to whether a faked response is to be generated or not from the buffer in which the address translation entry is located.

32. A method of managing processor access to resources in a computer system, the method comprising:

providing, in an address translation mechanism, a fake response identification as to whether or not a response for a received address associated therewith is to be faked; and selectively generating a faked response where the fake response identification for the received address indicates that a response is to be faked;

wherein the address translation mechanism provides a translation of received addresses by decoding first subset of bits of a received address and, on identifying a predetermined combination of those bits, passes a further subset of bits of the received address if a fake response identification indicates that a response for a received address is not to be faked.

* * * * *

UNITED STATES PATENT AND TRADEMARK OFFICE
CERTIFICATE OF CORRECTION

PATENT NO. : 6,795,936 B2
DATED : September 21, 2004
INVENTOR(S) : Harris et al.

It is certified that error appears in the above-identified patent and that said Letters Patent is hereby corrected as shown below:

Column 16,
Line 21, please delete "prevented there the" and replace with -- prevented where the --.
Line 66, please delete "naked" and replace with -- faked --.
Line 67, please delete "indication the" and replace with -- indication for the --.

Column 17,
Line 21, please delete "resource acces controller" and replace with --resource access controller --.

Column 18,
Line 44, please delete "decoding first" and replace with -- decoding a first --.

Signed and Sealed this

Twenty-first Day of December, 2004

JON W. DUDAS
*Director of the United States Patent and Trademark Office*